2,903,478

United States Patent Office
3,009,855
Patented Nov. 21, 1961

3,009,855
METHOD AND COMPOSITION OF DESTROYING INSECTS EMPLOYING 1-NAPHTHYL N-METHYL CARBAMATE
Joseph A. Lambrech, Charleston, W. Va., assignor to Union Carbide Corporation, a corporation of New York
No Drawing. Original application Aug. 7, 1958, Ser. No. 753,644, now Patent No. 2,903,478, dated Sept. 8, 1959. Divided and this application Aug. 7, 1959, Ser. No. 832,133
2 Claims. (Cl. 167—32)

This invention relates to new chemical compounds and to insecticidal compositions containing them. More particularly, the present invention relates to certain aryl esters of N-substituted carbamic acids and to insecticidal compositions containing the same. This application is a division of application Serial Number 753,644, filed August 7, 1958, now U.S. Patent No. 2,903,478.

The compounds of this invention may be represented by the general formula:

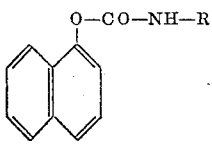

wherein R is lower alkyl.

Illustrative of such compounds are 1-naphthyl N-methyl carbamate, 1-naphthyl N-ethyl carbamate, 1-naphthyl N-n-propyl carbamate, 1-naphthyl N-isopropyl carbamate, 1-naphthyl N-n-butyl carbamate, 1-naphthyl N-tertiary butyl carbamate, 1-naphthyl N-isobutyl carbamate, 1-naphthyl N-pentyl carbamate, 1-naphthyl N-hexyl carbamate, 1-naphthyl N-heptyl carbamate, 1-naphthyl N-n-octyl carbamate, 1-naphthyl N-2-ethylhexyl carbamate and 1-naphthyl N-decyl carbamate.

The compounds of this invention may be prepared, generally, by reacting 1-naphthol with phosgene to form the corresponding chloroformate and reacting the chloroformate with a primary amine to form the corresponding carbamate and HCl. If desired, sodium naphthoxide may be used in place of 1-naphthol, in which case NaCl instead of HCl is the reaction product. In the formation of the chloroformate, the phosgene is dissolved in toluene or benzene or other suitable organic solvent and then added to the water solution of the hydroxy compound or its sodium salt at a temperature of from about −30° C. to 20° C. The reaction is slightly exothermic so that some external cooling is usually necessary. The chloroformate separates in the organic phase which is separated from the aqueous phase carrying the hydrogen or sodium chloride. The chloroformate may then either be isolated by distillation or used without further purification.

The reaction involving the addition of the chloroformate to the amine is carried out in the presence of solvents from the amine such as water or dioxane. The reaction temperature is preferably in the range from 10° C to 50° C. Below 10° C. the reaction proceeds but the rate is too slow and above 50° C. the reaction rate is so rapid that loss of low boiling amines may occur and some decomposition may take place.

The products of this invention are crystalline solids which can be isolated by filtration or centrifugation and dried.

The above described reactions may be represented graphically by the following general equations, in which R is lower alkyl:

(1) 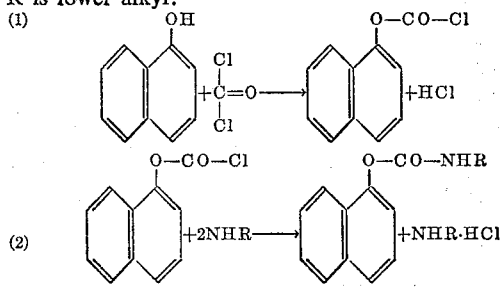

(2) 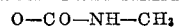 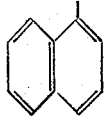

The following examples are illustrative:

EXAMPLE I.—PREPARATION OF 1-NAPHTHYL N-METHYL CARBAMATE

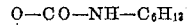 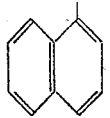

Following the general procedure, 1-naphthyl N-methyl carbamate was prepared by first preparing sodium 1-naphthoxide by reacting a mixture of 144 parts of 1-naphthol, 400 parts of water and 44 parts of sodium hydroxide at 85° C. for one hour and then cooling to 20° C. A mixture of 96 parts of phosgene and 300 parts of toluene was then added dropwise. After the addition of the phosgene the reaction mixture was agitated at 25° C. for one hour. The organic phase of the reaction mixture was separated from the salt solution and distilled. 1-naphthyl chloroformate boils at 96° C. to 100° C. at 2 mm. Hg.

1-naphthyl N-methyl carbamate was prepared by slowly adding 103 parts of 1-naphthyl chloroformate to a mixture of 100 parts of a 39 percent water solution of methylamine and 100 parts of water at 25° C. After the addition of the 1-naphthyl chloroformate the reaction mixture was agitated at 25° C. for one hour. The solid which separated was filtered, washed with water and dried. 1-naphthyl N-methyl carbamate is a white crystalline solid which melts at 142° C. Elemental analysis: carbon found 71.2 percent; theory 71.6 percent, hydrogen found 5.6 percent; theory 5.5 percent.

EXAMPLE II.—PREPARATION OF 1-NAPHTHYL N-HEXYL CARBAMATE

Following the general procedure, 1-naphthyl chloroformate was prepared by the reaction of sodium naphthoxide and phosgene. A mixture of 144 parts of 1-naphthol, 400 parts of water and 44 parts of sodium hydroxide was heated at 85° C. for one hour to complete the formation of sodium 1-naphthoxide and cooled to 20° C. A mixture of 96 parts of phosgene and 300 parts of toluene was then added dropwise. After the addition of the phosgene the reaction mixture was agitated at 25° C. for one hour. The organic phase of the reaction mixture was separated from the salt solution and distilled. 1-naphthyl chloroformate boils at 96° C. to 100° C. at 2 mm. Hg.

1-naphthyl N-hexyl carbamate was prepared by slowly adding 103 parts of 1-naphthyl chloroformate to a mixture of 101 parts N-hexylamine and 600 parts dioxane at 20° C. After the addition of the 1-naphthyl chloroformate the reaction mixture was agitated at 40° C. for thirty minutes. The mixture was cooled to 20° C. and the n-hexylamine hydrochloride was removed by filtration. The dioxane was then removed by distillation and the 1-naphthyl N-hexyl carbamate residue dissolved in ethyl ether and washed with water. Ethyl ether was then removed by distillation and 1-naphthyl N-hexyl carbamate taken as a residue product. 1-naphthyl N-hexyl carbamate is an amber colored liquid which has a specific gravity of 1.064 at 20° C./20° C. and a nitrogen analysis of 5.12 percent (theory 5.1 percent).

The compounds of the present invention are useful as insecticides. They are effective against a very broad range of insects, have a long lasting residual action, are compatible with commonly used miticides, fungicides, insecticides and adjuvants and are considerably less toxic than many commonly used insecticides.

In the following series of experiments, Compound Nos. 1–5, representing the present invention, were evaluated as insecticides. Compound Nos. 6–13 were tested for comparison.

No. 1—1-naphthyl N-methyl carbamate (melting point (M.P.)=142° C.)
No. 2—1-naphthyl N-ethyl carbamate (M.P.=102° C.)
No. 3—1-naphthyl N-n-hexyl carbamate (specific gravity=1.064 at 20° C./20° C.)
No. 4—1-naphthyl N-isopropyl carbamate (M.P.=112° C.)
No. 5—1-naphthyl N-butyl carbamate (M.P.=67° C.)
No. 6—1-naphthyl N,N-dibutyl carbamate (boiling point (B.P.)=184° C. at 1.5 mm. Hg)
No. 7—1-naphthyl N-(N',N'-dimethylamino)ethyl carbamate (B.P.=158–164° C. at 3 mm. Hg)
No. 8—1-naphthyl N-1-naphthyl carbamate (M.P.=260° C.)
No. 9—1-naphthyl N-(alpha-methyl)benzyl carbamate (M.P.=125° C.)
No. 10—Para-acetylphenyl N-methyl carbamate (B.P.=130–135° C. at 3 mm. Hg)

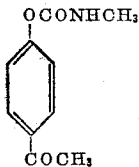

No. 11—Phenyl-N,N-dimethyl carbamate (M.P.=45° C.)
No. 12—Para-tertiary butyl phenyl-N,N-dimethyl carbamate (B.P.=110° C. at 15 mm. Hg)
No. 13—2,3,5-trimethyl phenyl-N-phenyl carbamate (M.P.=175–176° C.)

In one series of tests of the above-listed compounds, Mexican bean beetle larva (*Epilachna varivestis* Muls.) was chosen as a representative test insect and Tendergreen bean as a representative test plant. Aqueous suspensions of Compounds Nos. 1 through 13, were prepared at the rate of 0.25 gram of the compound dissolved in 10 milliliters (10 percent of the final volume of the suspension) of acetone in which was dissolved 0.025 gram (10 percent of the weight of the compound) of a non-ionic wetting and emulsifying agent which solution was added to sufficient water to give 100 ml. of the suspension upon agitation. The specific emulsifier used was "Tergitol Dispersant NPX" a proprietary non-ionic alkyl phenyl polyethylene glycol ether. The suspensions thus prepared and containing 0.25 percent of the chemical were sprayed on the bean plants to run-off, the plants being on a revolving turntable so that all parts of the plants were sprayed. After the plants were dry (about one hour after spraying) each plant was infested with fourth instar Mexican bean beetle larvae and then the leafy portion of the plant and the larvae were enclosed in a spherical wire mesh cage; and 72 hours after the infestation observations were made of the damage to foliage by the feeding larvae. The results of the tests are given in table I, below.

Table I

| Compound No. | Mexican Bean Beetle 72 hour rating |
|---|---|
| 1 | A |
| 2 | A |
| 3 | A |
| 4 | A |
| 5 | A |
| 6 | C |
| 7 | E |
| 8 | E |
| 9 | E |
| 10 | E |
| 11 | E |
| 12 | E |
| 13 | E |

The letter ratings in Table I are:

A=excellent control—little feeding (less than 10% foliage consumed)
C=fair control—moderate feeding (10–50% foliage consumed)
E=poor control—severe feeding (51–100% foliage consumed)

Tests were also made on Mexican bean beetle adults in a similar manner to the above described tests, employing varying concentrations of Compound No. 1 and of a known insecticide (rotenone). The kill of adult beetle was noted and plotted and the amount of toxicant giving a 95% kill ($LD_{95}$) was found to be 1.3 and 15.0 milligrams of toxicant in 100 milliliters of suspension, for Compound No. 1 and rotenone, respectively.

Tests were also conducted on bean aphid (*Aphis fabae* Scop.), using the compounds listed in Table II. For the bean aphid test, nasturtium plants growing in small clay pots were infested with about 100 to 150 aphids, and then sprayed in the manner previously stated with spray compositions containing 0.25 gram of the test compound, 10 milliliters of acetone, 0.025 gram of "Tergitol Dispersant NPX" and water to 100 milliliters. After spraying, the pots were placed on their sides in a Petri dish on a piece of white paper which had previously been ruled into squares to facilitate counting. The paper was ringed with tangle foot glue to prevent the test insects from escaping. Counts of the insects which fell to the paper and those left on the plant were made 24 hours after the spray application.

Table II

| Compound No. | Bean aphid 24 hour rating |
|---|---|
| 1 | A |
| 2 | A |
| 6 | C |
| 7 | E |
| 8 | E |
| 9 | E |
| 10 | E |
| 11 | E |
| 12 | E |
| 13 | E |

The letter ratings in Table II are:

A=excellent control (80–100% mortality)
C=fair control (30–79% mortality)
E=poor control (0–29% mortality)

Compound No. 1 was also tested in the field for phytotoxicity on the representative plants corn, bean, tomato, cabbage and broccoli. For this purpose dusts were prepared containing 2.5 and 5.0 parts of Compound No. 1 in sufficient inert particulate carrier to give 100 parts by weight. The carrier used was a finely divided pyrophyllite, as representative of such inert carriers as infusorial earth, clay, talc, pumice, bentonite diatomaceous earth, cotton seed flour, walnut shell flour and the like. Aqueous suspensions of Compound No. 1 were also prepared from a wettable powder consisting of 25 parts by weight of Compound No. 1 in sufficient inert particulate carrier and wetting agent to give 100 parts by weight. The aqueous suspensions were formulated to contain 4, 2 and 1 pounds of the wettable powder per 100 gallons of water. Three applications of the dust and suspensions of Compound No. 1 were made at approximately 10 day intervals. The dusts were applied so that complete coverage of the foliage was obtained and the aqueous suspensions were sprayed on the plants to run-off. Notations as to phytotoxicity were made seven days after each application of the spray and dust. Slight phytotoxicity was evident to the bean plants treated with the four pound dosage of Compound No. 1 following the third application; lower rates of application to beans showed no phototoxicity. There was no phytotoxicity at any time to any of the cabbage, broccoli, corn or tomato plants dusted or sprayed with Compound No. 1.

Compound No. 1, 1-naphthyl N-methyl carbamate, is a particularly effective insecticide, possessing a combination of desirable properties. Its broad spectrum of activity, its long residual action, and its effectiveness against insects which are resistant to many common types of insecticides and its low mammalian toxicity combine to make it one of the most outstanding insecticides ever developed.

In order to compare the effectiveness of Compound No. 1 with three closely related carbamates, a series of tests were conducted to evaluate the effectiveness of the test compounds against bean aphids, armyworms, Mexican bean beetles, German roaches, rice weevil, confused flour beetle, Eastern tent caterpillar, American cockroach, milkweed bug and Colorado potato beetle. The compounds tested were:

Compound No. 1: 1-naphthyl N-methyl carbamate
Compound A: 2-naphthyl N-methyl carbamate
Compound B: 1-naphthyl N,N-dimethyl carbamate
Compound C: 2-naphthyl N,N-dimethyl carbamate The tests employed were:

APHID FOLIAGE SPRAY TEST

*Test insect.*—Adult and nymphal stages of the bean aphid (*Aphis fabae* Scop.) reared on potted dwarf nasturtium plants constitute the test insect for this screening method. The insects are reared at 65°–70° F. and 50–70 percent room humidity. For testing purposes, the number of aphids to be used is standardized to 100–150 individuals per pot by trimming off plants containing excess aphids.

*Application of toxicant.*—The potted plants (one replicate for each compound) infested with 100–150 aphids, are placed on a revolving turntable. 100–110 ml. of the formulated water mixture of the chemical is applied to the plants by use of a DeVilbiss spray gun with air pressure set at 40 lbs. Application of this volume of formulated compound takes 30 seconds. This volume of spray is sufficient to wet the plants to runoff. 100–110 ml. of a water solution containing acetone and emulsifier in the same concentrations as the insecticidal mixture but without the candidate insecticide is also sprayed on the infested plants as a check or control.

*Concentration of toxicant.*—The test compounds are formulated by a standard procedure of solution in acetone, addition of an emulsifier, and dilution with water. Primary screening tests are run at 1000 p.p.m.

*Holding conditions.*—After spraying the pots are placed on their sides in a Petri dish on a sheet of white standard mimeograph paper which has been previously ruled into squares to facilitate counting. Temperature and humidity in the test room during the 24 hour-holding period are $80\pm5°$ F. and $50\pm5$ percent respectively.

*Record of results.*—Aphids which have fallen to the paper and are unable to remain standing after being uprighted are considered dead. Aphids remaining on the plants are observed closely for movement and those which can not move the length of the body even upon stimulation by prodding are considered dead. Each compound is rated according to the following designations:

5=excellent control (80–100% mortality)
3=fair control (30–79% mortality)
1=poor control (0–29% mortality)

Compounds receiving a rating of 5 (80–100 percent mortality) pass to secondary testing.

In secondary testing the concentration of the toxicant is lowered in a dilution series in order to determine $LD_{50}$.

ARMYWORM LEAF DIP TEST

*Test insect.*—Larvae of the southern armyworm (*Prodenia eridania* Cram.) reared on Tendergreen beans in a room where temperature is held at $80\pm5°$ F. and R.H. $50\pm5$ percent, constitute the test insects for this screening method. The test larvae are removed from the colony and held without food for four hours prior to being placed on the treated foliage.

*Application of toxicant.*—Paired seed leaves, excised from Tendergreen bean plants, are dipped in the test formulations until they are thoroughly wetted. Excess liquid is removed by gentle shaking. While the leaves are drying in a ventilated hood, wilting is prevented by placing the stem in water. When dry, the paired leaves are separated and each is placed in a 9 cm. Petri dish lined with a filter paper. Four randomly selected larvae are introduced before closing the dish.

*Concentration of toxicant.*—The test compounds are formulated by a standard procedure of solution in acetone, addition of an emulsifier, and dilution with water. Primary screening tests are run at 1000 p.p.m.

*Holding conditions.*—The closed dishes are labeled and held at 80 to 85° F. for three days. Although the larvae can easily consume the whole leaf within twenty-four hours, no more food is added. Check larvae remain vigorous during the entire holding period and do not advance to the quiescent prepupal state. The holding time cannot be reduced to less than three days without sacrificing ease of reading the percentage mortality.

*Record of results.*—Larvae which are unable to move the length of the body, even upon stimulation by prodding, are considered dead. Possible repellent qualities of the test compounds are recorded as percentage feeding inhibition. While not excluding the possibility of contact insecticidal action, this test will indicate chemicals which display repellent or stomach poison effects in the absence of contact action. Each compound is rated according to the following rating designation:

5=excellent control (80–100% mortality)
3=fair control (30–79% mortality)
1=poor control (0–29% mortality)

Compounds receiving a rating of 5 (80–100 percent mortality and/or 90–100 percent inhibition of feeding) pass to secondary testing. In secondary tests the concentration of the toxicant is lowered in a dilution series to determine $LD_{50}$ values.

MEXICAN BEAN BEETLE LEAF DIP TEST

*Test insect.*—Third instar larvae of the Mexican bean beetle, (*Epilachna varivestis* Muls.) reared on Tendergreen beans in a room where temperature is maintained at $80\pm5°$ F. and R.H. $50\pm5$ percent, are the test insects.

*Application of toxicant.*—Paired seed leaves excised from Tendergreen bean plants, are dipped in the test formulations until they are thoroughly wetted. Excess liquid is removed by gentle shaking. While the leaves are drying wilting is prevented by placing the stems in water. When dry, the paired leaves are separated and each is placed in a 9 cm. Petri dish lined with filter paper. Four randomly selected larvae are introduced before closing the dish.

*Concentration of toxication.*—The test compounds are formulated by a standard procedure of solution in acetone, addition of an emulsifier, and dilution with water. Primary screening tests are run at 1000 p.p.m.

*Holding conditions.*—The closed dishes are labeled and held at 80±5° F. for three days. Although the larvae can easily consume the whole leaf within 24–48 hours, no more food is added. Check larvae remain vigorous during the entire holding period and do not advance to the quiescent prepupal state. The holding time cannot be reduced to less than three days without sacrificing ease of reading the percentage mortality.

*Record of results.*—Larvae which are unable to move the length of the body, even upon stimulation are considered dead. Possible repellent qualities of the test compounds are recorded as percentage inhibition of feeding. While not excluding the possibility of contact insecticidal action, this test also indicates compounds which display repellent or stomach poison effects. Each compound is rated according to the following rating designation:

5=excellent control (80–100% mortality)
3=fair control (30–79% mortality)
1=poor control (0–29% mortality)

Inhibition of feeding in the absence of mortality deserves special consideration and is denoted by an appropriate notation.

Compounds receiving a rating of 5 (80–100 percent mortality and/or 90–100 percent inhibition of feeding) pass to secondary testing. In secondary tests the concentration of the toxicant is lowered in a dilution series to determine $LD_{50}$ values.

GERMAN COCKROACH IMMERSION TEST

Adult, male German cockroaches, *Blatella germanica* (L.) 8–9 weeks after hatching) were anaesthetized with carbon dioxide and placed into 100 ml. beakers in groups of 10 each. Fifty ml. of the chemical test solution (formulated in acetone, emulsifier and water) were poured onto the insects and quickly poured back and forth (beaker to beaker) five times. The roaches were blotted dry and held at 27–30° C. for three days. Controls were treated likewise in solution without chemical. Mortality counts were made at 1 and 3 days and roaches unable to turn over or demonstrate normal walking movements were considered dead.

CONFUSED FLOUR BEETLE AND RICE WEEVIL

Acetone solutions containing the test chemicals were evaporated from halves of Petri-dishes to leave films of the compounds equivalent to 200, 20 and 2 mg./sq. ft. of surface. Ten adult confused flour beetles, *Tribolium confusum* Duv. of rice weevils, *Sitophilus oryzae* (L.) were added to each dish. Percent mortality was recorded after 24 hours.

EASTERN TENT CATERPILLAR TESTS

The Eastern tent caterpillar, *Malacosoma americana* (F.) tests were performed by the same method described for the army-worm.

AMERICAN ROACH INJECTION

American cockroaches, *Periplaneta americana* (L.) were injected intraabdominally with the test compounds contained in 1 microliter doses of acetone, by means of a micrometer-driven syringe. Mortality counts were made 24 hours later and control insects injected with solvent alone were unaffected.

MILKWEED BUG TESTS

Topical application of microdrops were applied onto the ventral surface of the thoraces of milkweed bug, *Incopeltus fasciatus* Dall., adults. The chemicals were contained in 1 microliter doses of acetone and applied with a micrometer-driven syringe. Percentage mortality was recorded after 24 hours.

COLORADO POTATO BEETLE

Tests performed on late instar Colorado potato beetle, *Leptinotarsa decemlineata* (Say), larvae were identical to those described for the Mexican bean beetle. The only change was a 24 hour mortality count.

The results of these tests are presented in Table III, below, which also gives the results of tests wherein compounds A, B and C are employed at the same dosage at which Compound No. 1 gave 80 percent control of the test insect.

*Table III*

| Test insect | Compound | $LD_{50}$[a] (mg./100 ml.) | $LD_{95}$[a] (mg./100 ml.) | Percent control (conc.) |
|---|---|---|---|---|
| Bean aphid | No. 1 | 2 | 5 | 80% (3 mg.). |
|  | A | 5 | 30 | 20% (3 mg.). |
|  | B | 500 | 500 | No control (3. mg.). |
| Armyworm | No. 1 | 14 | 55 | 80% (30 mg.). |
|  | A | 170 | 350 | No control (30 mg.). |
|  | B | 500 | 500 | Do. |
| Mexican bean beetle | No. 1 | 1.5 | 3 | 80% (2 mg.). |
|  | A | 55 | 90 | No control (2 mg.). |
|  | B | 12 | 20 | Do. |
| German roach | No. 1 | 3 | 6 | 80% (4.5 mg.). |
|  | A | 4 | 18 | 55% (4.5 mg.). |
|  | B | 9 | 60 | 30% (4.5 mg.). |
| Rice weevil [b] | No. 1 | 0.5 | 4 | 80% (1.5 mg.). |
|  | A | 200 | 200 | No control (200 mg.). |
|  | B | 18 | 65 | 80% (35 mg.). |
|  | C | >200 | >200 | No control (200 mg.). |
| Confused flour beetle [b] | No. 1 | 0.5 | 4 | 80% (1.5 mg.). |
|  | A | >200 | >200 | No control (200 mg.). |
|  | B | 6 | 12 | 80% (10 mg.). |
|  | C | >200 | >200 | No control (200 mg.). |
| Eastern tent caterpillar | No. 1 | 15 | 45 | 80% (27 mg.). |
|  | A | >60 | >60 | No control at 60 mg. |
|  | B | >60 | >60 | Do. |
|  | C | >60 | >60 | Do. |
| Colorado potato beetle | No. 1 | 2.5 | 9.0 | 80% (7.5 mg.). |
|  | A | 12 | 20 | 80% (18 mg.). |
|  | B | >100 | >100 | No control (100 mg.). |
|  | C | >100 | >100 | Do. |
| American cockroach [c] | No. 1 | 2.5 | 4.0 | 80% (3.2 μg.). |
|  | A | >20 | >20 | No control (20 μg.). |
|  | B | 20 | >20 | 50% (20 μg.). |
|  | C | >20 | >20 | No control (20 μg.). |
| Milkweed bug [c] | No. 1 | 0.25 | 0.6 | 80% (0.5 μg.). |
|  | A | >20 | >20 | No control (20 μg.). |
|  | B | >20 | >20 | 20% (20 μg.). |
|  | C | >20 | >20 | No control (20 μg.). |

[a] $LD_{50}$ and $LD_{95}$ are, respectively, the concentrated chemical (mg./100 ml.) required to give 50 and 95 percent kill.
[b] Concentrations for these tests are expressed as mg. per square foot of area. All other concentrations in table are expressed as mg./100 ml. of test solution or per footnote c.
[c] Expressed as micrograms per insect.

It can clearly be seen from Table III that in every instance Compound No. 1 was outstandingly more effective than any of Compounds A, B or C.

In addition to the above series of tests, the relative efficiency of the test chemicals, as cholinesterase inhibitors, against a standardized insect enzyme, was determined using a Warburg manometric assay. The preparation employed was a brei of house fly, *Musca domestica* L., heads adjusted to hydrolyze sufficient acetyl choline to liberate 300 microliters of $CO_2$ from a bicarbonate buffer in 30 minutes. The results are presented in Table IV as molar concentration of chemical required to inhibit 50 percent of the activity of this enzyme and can be interpreted as a direct measure of the relative toxicity potential expressed for this species.

*Table IV.—House Fly Cholinesterase Test (in vitrio)*

| Compound | $I_{50}$ |
| --- | --- |
| No. 1 | $3 \times 10^{-7}$ M. |
| A | $1.2 \times 10^{-5}$ M. |
| B | $2.4 \times 10^{-6}$ M. |
| C | $2.9 \times 10^{-5}$ M. |

It can be seen from Table IV that Compound No. 1 was 10 to 100 times more effective as a cholinesterase inhibitor than the other compounds tested.

The effectiveness of Compound No. 1 is further illustrated by the following series of field tests.

In one series of filed tests, Compound No. 1 was evaluated for its control of codling moths (*Carpocapsa pomonella*) on apples under field conditions in the Northeastern United States. For comparison, a standard phosphate insecticide and a standard inorganic insecticide were also evaluated. In this series of tests, each chemical was applied to seven trees, selected at random in a mixed variety block of over one hundred trees of the McIntosh, Cortland and Rhode Island Greening varieties. The chemicals were applied as aqueous sprays, using a commercial hydraulic rig at the rate of 20 gallons per tree. Applications were made on each of the following dates: June 10, June 25, July 10, July 25, August 8 and August 21. Readings were made at harvest, September 16, by observing the damage on 2100 apples from each treatment. The results of these tests are given in Table V below. In Table V the results found are compared with the results found for Sevin control trees on which no treatment was employed.

*Table V*

| Chemical | Lbs. chemical per 100 gallons | Percent wormy apples (1st brood) | Worms per 100 apples |
| --- | --- | --- | --- |
| Compound No. 1 | 0.25 | 0.3 | 0.8 |
| Standard phosphate | 0.15 | 2.7 | 1.1 |
| Standard inorganic | 3.00 | 1.0 | 4.8 |
| No treatment | | 17.3 | 116.1 |

It can be seen from Table V that Compound No. 1 provides outstanding control under field conditions of the most important apple insect.

In a second series of field tests, Compound No. 1 was evaluated for control of codling moth (*Carpocapsa pomonella*); red-banded leaf roller (*Argyrotaenia velutinana*), and plum curculio (*Conotrachelus nenuphar*) on apples under field conditions in Central United States. For comparison, a standard chlorinated hydrocarbon was also evaluated. Each chemical was applied to 16 trees (15 year old trees of the Jonathan or Delicious variety) in four groups of four trees each. The chemicals were applied as aqueous sprays using a commercial hydraulic rig at the rate of 12 gallons per tree. A full series of eight cover sprays were applied from May to August at an average of ten-day interval. Readings were made at harvest in early September, four weeks after the last cover spray was applied. The readings were made by examining the total fruit produced by each tree during the entire season. The results of these tests together with the results obtained in a control group of trees are presented in Table VI below.

*Table VI*

| Chemical | Lbs. chemical per 100 gal. | Percent apples injured by codling moth | RBLR | Plum curc. | Percent clean fruit | Total fruit |
| --- | --- | --- | --- | --- | --- | --- |
| Cmpd. No. 1 | 0.5 | 0.04 | 0.00 | 0.00 | 99.01 | 2,096 |
| Std. chl. hydro. | 1.0 | 2.29 | 0.47 | 0.14 | 96.52 | 2,140 |
| No treatment | | 59.72 | 6.05 | 2.74 | 31.10 | 2,792 |

It can be seen from Table VI that Compound No. 1 gives excellent extra control of a number of major insect pests on apples under field conditions.

In a third series of field tests, Compound No. 1 was evaluated for effectiveness against cotton aphid (*Aphis gossypii*); boll weevil, (*Anthonomus grandis*) and bollworm, (*Heliothis zea*) on cotton under field conditions in Mexico. For comparison, a combination standard phosphate-standard chlorinated hydrocarbon was also evaluated. Each chemical was applied to five randomized plots of ½ acre each. The chemicals tested were applied with standard hand-gun dusting equipment, using sulfur as a carrier. The applications were made at 5 to 7 day intervals with a total of 11 applications during the period from October 6 to December 16. Readings were made at weekly intervals from October 5 through November 29 by examining 200 cotton squares per plot for boll weevil infestation, two hundred cotton squares per plot for bollworm and by counting aphids on 50 square inches of lead surface per plot. The results of these tests together with the results obtained with a control are given in Table VII, below.

*Table VII*

| Chemical | Lbs. chemical per acre | Seasonal average infestations | | |
| --- | --- | --- | --- | --- |
| | | Cotton aphids per sq. inch | Percent weevil punctured bolls | Percent bollworm injured square |
| Cmpd. No. 1 | 2.45 | 9.0 | 12.7 | 0.7 |
| Combination of standard phosphate and standard chlorinated hydrocarbon | 1.82 | 11.2 | 14.9 | 1.7 |
| No treatment | | 19.6 | 45.3 | 23.5 |

It can be seen from Table VII that exceptionally good control of three major cotton pests is obtained using Compound No. 1 under normal field conditions.

In a fourth series of field tests, Compound No. 1 was evaluated for control of major cotton pests including boll weevil (*Anthonomus grandis*); bollworm (*Heliothis zea*), and aphid (*Aphis gossypii*) on cotton under field conditions in Southeastern United States. For comparison, a standard insecticide mixture was also evaluated. Each chemical was applied to four randomized plots of ⅕ acre each. The applications were made at night with a tractor-mounted 6-row duster and were made on the following dates: June 18, 26, July 1, 5, 10, 17, 22, 29, August 1, 5, 9, 14 and 21. The readings were made on June 29, July 3 8, 12, 22, 24, 31 and August 5. For the square infestation count, one hundred squares for each plot were examined each date. The boll count for bollworm was made similarly, on August 14 and 28. Aphid counts were made on August 1, 6 and 15 by microscopic examination of 25 leaves picked each date by random of the upper third of plants in each plot. The results obtained as well as the results observed for a control are presented in Table VIII below:

Table VIII

| Chemical | Rate act. compound per acre, lbs. | Square infestation, percent | | Boll infestation by bollworm, percent | Aphid per square inch, number |
| --- | --- | --- | --- | --- | --- |
| | | Boll weevil | Bollworm | | |
| Cmpd. No. 1 | 2.27 | 6.2 | 0.03 | 0.00 | 0.03 |
| Std. combination of phosphate, chlorinated hydrocarbon and inorganic insecticide | 1.42 | 11.4 | .06 | .62 | .07 |
| No treatment | | 46.5 | .25 | 3.00 | .81 |

It can be seen from Table VIII that Compound No. 1 gives exceptional control of a number of major cotton pests under field conditions.

In a fifth series of field tests, Compound No. 1 was evaluated for control of potato leafhopper (*Empoasca fabae*); six-spotted leafhopper (*Macrosteles fascifrons*); spittlebug (*Philaenus leucophthalmus*), and potato flea beetle (*Epitrix cucumeris*) on potatoes under field conditions in North Central United States. For comparison, a standard chlorinated hydrocarbon insecticide and a standard phosphorus insecticide were also evaluated. Each was applied to two randomized plots, each containing four 50-foot rows of potatoes. The treatments were applied with commercial spray equipment and 200 lbs. pressure at the rate of 100 gallons per acre. Applications were made on August 2 and 13 and September 5 and readings were made on August 5, 15 and 27, September 6 and 16. The readings were made by making ten single sweeps of a 15-inch insect net in each plot for each count. The results of these tests, together with the observations made on control plots are given in Table IX below.

Table IX

| Chemical | Lbs. chemical per acre | Total number of insects from 5 counting dates | | | |
| --- | --- | --- | --- | --- | --- |
| | | Potato leafhopper | 6-spotted leafhopper | Spittlebug | Potato flea beetle |
| Cmpd. No. 1 | 1.0 | 15 | 3 | 0 | 14 |
| Standard chlorinated hydrocarbon | 1.0 | 20 | 7 | 2 | 95 |
| Standard phosphate | 0.5 | 42 | 13 | 2 | 36 |
| No treatment | | 26 | 11 | 5 | 254 |

It can be seen from Table IX that, under field conditions, Compound No. 1 gives excellent control of a number of representative insects which are common pests on potatoes.

The toxicants or insecticides contemplated herein i.e. the compounds of this invention, are not deleteriously affected by suitable adjuvants and additives, for instance blood albumin or skimmed milk, nor are the phytotoxic properties of the toxicants affected by such agents. However, the toxicants are preferably not applied to plants in solution in non-volatile solvents, for instance oils of the type which are, of themselves, phytotoxic although such oil solutions may be used in treating paper, cardboard and the like. It is a feature of the invention that the toxicants contemplated herein are so chemically inert that they do not react with the various agents nor do they react chemically with the foliage or other parts of the plant or seed, either with or without the additive agents, in a deleterious manner.

For application to those parts of the plant which are above ground, the toxicants are preferably applied as water base sprays, the sprays containing the toxicants in finely divided condition, this condition easily being obtained by mixing a solution of the toxicant in a water soluble solvent, for instance acetone, into a larger volume of water whereupon the toxicants are thrown out of solution in the finely divided substantially colloidal condition. In the final spray, the acetone is present in only minute amount and that amount quickly volatilizes as the spray dries. Where the toxicants are used as insecticides in grain or seed treatments, they may be applied to the grain or seeds as a dust, preferably with an adhesive adjuvant, merely being tumbled with the seeds or grain. To obtain a dust, either a concentrate or a dilute composition, having the toxicant in extremely finely divided form or a solution of the toxicant in a volatile solvent, may be mixed into a particulate extender, for instance talc or an adhesive adjuvant, and then dried. The volatilization of the solvent deposits the toxicant on the extender in substantially colloidal sized particles. Regrinding may be necessary to obtain correct particle size. Aqueous spray compositions may also be prepared by grinding the toxicants in water to make a concentrated dispersion, or even with so little water as to make a paste which is then incorporated at the point of use with sufficient additional water to give a spray wherein the toxicant has the desired concentration. The concentrates, either in the form of solutions, concentrated aqueous suspensions, pastes or dusts, may contain such other components of the spray as are desirable, for instance nicotine sulfate or other insecticides or fungicides.

The concentrates from which the ultimate aqueous sprays or dusts are to be prepared preferably contain between 10 and 70 parts by weight of the toxicant with sufficient additional material either inert or active (for instance a contact insecticide or a fungicide) to make 100 parts by weight. The ultimate sprays or dusts are prepared by adding a convenient amount of additional material including inert materials and such addends, for instance nicotine sulfate or other insecticide or fungicide, as may be desired in the spray or dust schedule and as the agriculturalist is in the habit of using, so that when the crop plants are thoroughly dusted or sprayed, the toxicants herein contemplated are applied at rates of from $1/32$ to 50 lbs. of active toxicant. Whether the toxicants are applied in dust formulations or as aqueous sprays, they are preferably applied in finely divided form. Aqueous sprays prepared by mixing a solution of the toxicants into water are, in general, preferred as the toxicants precipitate in the water in substantially colloidal form and when such a slurry or suspension is applied to the plant the foliage of the plant is thoroughly but adequately covered with the toxicant and the minute particles of the toxicant firmly lodge in the irregularities of the plant surface so that the toxicant is not dislodged by rain nor the flexing of the plant by wind. Satisfactory sprays for general use contain from about ½ to 4 pounds of the toxicant to be applied per acre.

Emulsifying agents or suspending agents may be used if desired; in general if the spraying device has mechanism for continually agitating the spray compositions, little or no emulsifying agent need be used but where it is desired to maintain the toxicants in suspension for several hours without agitation a higher amount of emulsifying agent is desirable. The amount of emulsifying agent preferably runs from about 1 pound to 10 pounds per 100 pounds of toxicant but desirably as little emulsifying agent is used as is possible consistent with the desired emulsion characteristics of the spray, so that rain does not re-emulsify the toxicant after it is applied to the plant and wash it off of the plant.

For general use the toxicants are applied as homogeneous aqueous dispersions by the use of surface active agents. These agents cause the toxicants easily to be dispersed in water to give the aqueous sprays. The surface active agents employed may be anionic, cationic or non-ionic and include, for example, sulfonated animal, vegetable and petroleum oils, sodium lauryl sulfate glycerol monostearate, ethylene oxide condensation products with octyl phenol, lauryl pyridium bromide and cetyldimethylbenzyl ammonium chloride. The surface active agent can comprise from 1 percent to 15 percent by weight of the concentrate.

The insecticides contemplated herein prevent attack by insects upon plants or other material to which the insecticides are applied and they have high residual toxicity. With respect to plants they have a high margin of safety in that, when used in sufficient amount to kill or repel the insects, they do not burn or injure the plant and they resist weathering which includes wash-off caused by rain, decomposition by ultra violet light, oxidation or hydrolysis in the presence of moisture or, at least, such decomposition, oxidation and hydrolysis as materially decrease the desirable insecticidal characteristics of the toxicants or impart undesirable characteristics, for instance phytotoxicity, to the toxicants. As previously stated the toxicants are so chemically inert that they are compatible with substantially any other constituents of the spray schedule. The low water solubility of the toxicants enable them to be used in the soil upon seeds or the roots of plants without injuring either the seeds, roots or plants by imbibition or root-uptake and they have such low mammalian toxicity that when applied to either the foliage of a plant or the parts of a plant which are below the surface of the soil, for instance tubers and the like, either humans or animals consuming the plants are not injured although, with respect to insects, they kill where the insects imbibe them either through food or, as in the case of the mosquito larvae, through imbibition from the environment.

Apart from the distinctive insecticidal properties of the materials herein disclosed, adapting them for agricultural use, the materials generally may be used as modifiers for resin manufacture and they may find applications in the pharmaceutical arts either as drugs, intermediates or as chemotherapeutants.

What is claimed is:
1. Method of killing insects which comprises subjecting them to lethal doses of 1-naphthyl N-methyl carbamate.
2. An insecticide comprising an extender and, as an active insect toxicant, 1-naphthyl N-methyl carbamate.

References Cited in the file of this patent

UNITED STATES PATENTS 2,903,478   Lambrech _____ Sept. 8, 1959

UNITED STATES PATENT OFFICE
CERTIFICATE OF CORRECTION

Patent No. 3,009,855          Dated November 21, 1961

Inventor(s) Joseph A. Lambrech

It is certified that error appears in the above-identified patent and that said Letters Patent are hereby corrected as shown below:

Column 1, line 19, after "2,903,478" insert --which is in turn a continuation-in-part application of Serial No. 531,274, filed August 29, 1955, now U.S. Patent No. 3,084,096.--.

Signed and Sealed this

Twenty-eighth Day of September 1976

[SEAL]

Attest:

RUTH C. MASON
Attesting Officer

C. MARSHALL DANN
Commissioner of Patents and Trademarks

UNITED STATES PATENT OFFICE
CERTIFICATE OF CORRECTION

Patent No. 3,009,855              Dated November 21, 1961

Inventor(s) Joseph A. Lambrech

It is certified that error appears in the above-identified patent and that said Letters Patent are hereby corrected as shown below:

The term of this patent subsequent to September 8, 1976 has been disclaimed.

Signed and Sealed this

Eighth Day of August 1978

[SEAL]

Attest:

RUTH C. MASON
Attesting Officer

DONALD W. BANNER
Commissioner of Patents and Trademarks